United States Patent
You et al.

(10) Patent No.: US 12,107,667 B2
(45) Date of Patent: Oct. 1, 2024

(54) METHOD AND SYSTEM FOR OPTIMIZING OPTICAL POWER MANAGEMENT OVER AN OPTICAL COMMUNICATION NETWORK USING A DIGITAL-TWIN THEREOF

(71) Applicant: HUAWEI TECHNOLOGIES CO., LTD., Guangdong (CN)

(72) Inventors: Yuren You, Ottawa (CA); Mahdi Hemmati, Kanata (CA); Christopher Frank Janz, Dunrobin (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 17/967,490

(22) Filed: Oct. 17, 2022

(65) Prior Publication Data
US 2024/0129055 A1    Apr. 18, 2024

(51) Int. Cl.
*H04J 14/02* (2006.01)

(52) U.S. Cl.
CPC .............................. *H04J 14/0221* (2013.01)

(58) Field of Classification Search
CPC .. H04J 14/0221; H04J 14/02; H04J 14/02212; H04J 14/02214; H04J 14/02218; H04J 14/02219; H04B 10/0775; H04B 10/0773; H04B 10/0795; H04B 10/07955
See application file for complete search history.

(56) References Cited

U.S. PATENT DOCUMENTS

| | | | |
|---|---|---|---|
| 2021/0272394 A1* | 9/2021 | Cella | G07C 5/008 |
| 2022/0083707 A1* | 3/2022 | Santhar | G06F 30/20 |
| 2023/0057479 A1* | 2/2023 | Pickerd | G01R 31/2834 |
| 2023/0076671 A1* | 3/2023 | Tanaka | H04L 41/40 |

FOREIGN PATENT DOCUMENTS

WO    WO-2021166015 A1 *   8/2021   ............. H04B 10/07

* cited by examiner

*Primary Examiner* — Hibret A Woldekidan
(74) *Attorney, Agent, or Firm* — BCF LLP

(57) ABSTRACT

System and method for optimizing optical power management along one or more optical channels of an optical communication network (OCN), the OCN comprising a plurality of optical channels. The method comprises accessing a digital twin (DT) of the OCN, receiving a desired optimization instruction to optimize the one or more optical channels in view of at least one operational parameter, executing an optical power optimization module on the DT by simulating application of at least one network configuration of the at least one optical channel, each network configuration having a corresponding predicted optimized level indicative of expected performances of the at least one optical channel of the OCN for the corresponding network configuration. In response to the predicted optimization level of a given network configuration satisfying a criterion, the network configuration is identified as a target network configuration and applied on the OCN.

34 Claims, 10 Drawing Sheets

METHOD AND SYSTEM FOR OPTIMIZING OPTICAL POWER MANAGEMENT OVER AN OPTICAL COMMUNICATION NETWORK USING A DIGITAL-TWIN THEREOF

CROSS-REFERENCE TO RELATED APPLICATIONS

This is the first application filed for the instantly disclosed technology.

FIELD OF THE TECHNOLOGY

The present disclosure generally relates to the field of optical communications and, in particular, to methods and systems for optimizing optical power management over an optical communication network.

BACKGROUND

Typical implementation of optical networks, such as, for example, dense wavelength division multiplex (DWDM) networks, involves an enormous number of optical devices and optical communication lines making standard monitoring systems inefficient. Moreover, during propagation of an optical signal along an optical communication line including a plurality of communication channels between a first network node and a receiving device, various impairments may appear. These could include self-phase modulation effect or cross-phase modulation effect occurring between a plurality of channels of the optical communication line. In coherent optical communication systems, the fiber nonlinear interference (NLI) is also an important impairment.

Therefore, operation and maintenance of WDM networks are very complex tasks due to the variety of optical physical impairments that affect signal transmission performance over its own provisioned path in the optical communication network. These optical impairments may also result in a high risk of interfering with running services provided by the optical communication network on other channels through multiple inter-channel coupling factors. As a result, any power adjustment must meticulously ensure that an execution thereof on the optical communication network does not deteriorate or degrade any of the existing services on the optical communication network.

Therefore, there is an interest in being able to determine optimized configuration of the optical communication network communication in order to efficiently optimize optical power management along optical communication lines of an optical communication network without at least some of the above noted disadvantages.

SUMMARY

An aspect of the present disclosure is to provide a method for optimizing optical power management over one or more optical channels of an optical communication network (OCN), the OCN comprising a plurality of optical channels, the method being performed by a controller connected to the OCN. The method comprises accessing a digital twin (DT) of the OCN, the DT being configured to model components of the OCN and optical communications therebetween, the DT having been generated based at least in part on an initial architecture of the OCN; accessing operational information of the OCN, the operational information of the OCN comprising information about optical power values of the one or more optical channels, network configurations and operational parameters thereof; updating the DT based at least in part on the operational information of the OCN; and receiving a desired optimization instruction. The desired optimization instruction comprises information about an identification of the one or more optical channels, and at least one operational parameter to be optimized. The method further comprises executing an optical power optimization module on the DT. Execution of the optical power optimization module power algorithm comprises simulating application of at least one network configuration of the at least one optical channel, each network configuration having a corresponding predicted optimized level indicative of expected performances of the at least one optical channel for the corresponding network configuration. For a given simulated network configuration, in response to the corresponding predicted optimization level of the given network configuration satisfying a pre-determined criterion, the method comprises identifying the given network configuration as a target network configuration, the target network configuration being expected to satisfy the pre-determined criterion; generating operational instructions for applying the target network configuration on the one or more optical channels, and executing the operational instructions to apply the target network configuration on the OCN.

In some implementations of the method, generating the operational instructions comprises determining a sequence of adjustments for producing the target network configuration to be applied on the OCN; and executing the operational instructions comprises applying the sequence of adjustments on the OCN.

In some implementations of the method, the OCN is a Wavelength Division Multiplexing (WDM) network.

In some implementations of the method, the desired optimization instruction is submitted by a user of the system to the controller.

In some implementations of the method, the method further comprises, for a given network configuration, in response to the corresponding predicted optimization level not satisfying the criterion, adjusting the given network configuration, thereby defining a new network configuration; and generating, based on the new network configuration, a modified predicted optimization level.

In some implementations of the method, the optical power optimization module is a Machine Learning algorithm (MLA), a reinforcement learning algorithm (RLA) or a heuristic algorithm, the optical power optimization module having been trained to adjust a network configuration to increase performances of the one or more optical channels with respect to the at least one operational parameter.

In some implementations of the method, the at least one operational parameter comprises at least one of Optical Signal-to-Noise Ratio, Optical Signal-to-Noise Ratio Loss, Generalized Signal-to-Noise Ratio Loss, Generalized Signal-to-Noise Ratio, and Bit Error Rate.

In some implementations of the method, the method further comprises continuously accessing instant operational information of the OCN; and in response to accessing the instant operational information, updating the DT based on the instant operation information.

In some implementations of the method, continuously receiving the instant operation information comprises receiving information about optical power values measured at the components of the OCN, network configuration changes and states of components of the OCN.

In some implementations of the method, the controller is included in a Network Management System operatively connected to the components of the OCN.

In some implementations of the method, the desired optimization instruction comprises information about a desired concurrent optimization of a plurality of operational parameters, and executing the optical power optimization module comprises determining a plurality of network configurations and a plurality of expected optimization level, each network configuration being associated with a corresponding expected optimization level; and providing the network configurations along with the corresponding expected optimization levels via a user-interface.

In some implementations of the method, the method further comprises receiving, from a user via the user-interface, indication of a selected network configuration; and applying the selected network configuration on the OCN.

In some implementations of the method, the method further comprises, prior to applying the operational instructions on the OCN, providing, to a user, an indication of the predicted optimization level via a user-interface.

In some implementations of the method, accessing the DT of the OCN comprises receiving, by the controller, a snapshot of the OCN, the snapshot comprising information about hardware and software characteristics of components of the OCN and interconnections between said components.

In some implementations of the method, the method further comprises, prior to accessing the DT of the OCN generating the DT of the OCN by receiving, by the controller, a snapshot of the OCN, the snapshot comprising information about hardware and software characteristics of components of the OCN and interconnections between said components.

In some implementations of the method, the predicted optimization level satisfies the criterion in response to the predicted optimization level being above an optimization threshold.

In some implementations of the method, the desired optimization instruction further comprises information about a target optimization value for each of the at least one operational parameter to be optimized; and the optimization threshold is based on the target optimization value.

A second aspect of the present disclosure is to provide a system for optimizing optical power management along one or more optical channels of an optical communication network (OCN), the OCN comprising a plurality of optical channels, the system comprising a controller and a memory. The memory comprises instructions which, upon being executed by the processor, cause the controller to access a digital twin (DT) of the OCN, the DT being configured to model components of the OCN and optical communications therebetween, the DT having been generated based at least in part on an initial architecture of the OCN; access operational information of the OCN, the operational information of the OCN comprising information about optical power values of the one or more optical channels, network configurations and operational parameters thereof; update the DT based at least in part on the operational information of the OCN; and receive a desired optimization instruction. The desired optimization instruction comprises information about an identification of the one or more optical channels, and at least one operational parameter to be optimized. The controller is further caused to execute an optical power optimization module on the DT, execution of the power algorithm comprising simulating application of at least one network configuration of the at least one optical channel, each network configuration having a corresponding predicted optimized level indicative of expected performances of the at least one optical channel for the corresponding network configuration. The controller is further caused to, for a given simulated network configuration, in response to the corresponding predicted optimization level of the given network configuration satisfying a criterion, identify the given network configuration as a target network configuration, the target network configuration being expected to satisfy the criterion, generate operational instructions for applying the target network configuration on the one or more optical channels, and execute the operational instructions to apply the target network configuration on the OCN.

In some implementations of the system, the controller is further configured to generate the operational instructions comprises determining a sequence of adjustments for producing the target network configuration to be applied on the OCN; and execute the operational instructions comprises applying the sequence of adjustments on the OCN.

In some implementations of the system, the OCN is a Wavelength Division Multiplexing (WDM) network.

In some implementations of the system, the desired optimization instruction is submitted by a user of the system to the controller.

In some implementations of the system, the controller is further configured to, for a given network configuration and in response to the corresponding predicted optimization level not satisfying the criterion adjust the given network configuration, thereby defining a new network configuration; and generate, based on the new network configuration, a modified predicted optimization level.

In some implementations of the system, the optical power optimization module is a Machine Learning algorithm (MLA), a reinforcement learning algorithm (RLA) or a heuristic algorithm, the optical power optimization module having been trained to adjust a network configuration to increase performances of the one or more optical channels with respect to the at least one operational parameter.

In some implementations of the system, the at least one operational parameter comprises at least one of Optical Signal-to-Noise Ratio, Optical Signal-to-Noise Ratio Loss, Generalized Signal-to-Noise Ratio Loss, Generalized Signal-to-Noise Ratio, and Bit Error Rate.

In some implementations of the system, the controller is further configured to continuously access instant operational information of the OCN; and in response to accessing the instant operational information, update the DT based on the instant operation information.

In some implementations of the system, the controller is further configured to receive information about optical power values measured at the components of the OCN, network configuration changes and states of components of the OCN.

In some implementations of the system, the controller is included in a Network Management System operatively connected to the components of the OCN.

In some implementations of the system, the desired optimization instruction comprises information about a desired concurrent optimization of a plurality of operational parameters, and the controller is further configured to, upon executing the optical power optimization module determine a plurality of network configurations and a plurality of expected optimization level, each network configuration being associated with a corresponding expected optimization level; and provide the network configurations along with the corresponding expected optimization levels via a user-interface.

In some implementations of the system, the controller is further configured to receive from a user via the user-interface, indication of a selected network configuration; and apply the selected network configuration on the OCN.

In some implementations of the system, the controller is further configured to, prior to applying the operational instructions on the OCN provide, to a user, an indication of the predicted optimization level via a user-interface.

In some implementations of the system, the controller is further configured to, in order to access the DT of the OCN receive a snapshot of the OCN, the snapshot comprising information about hardware and software characteristics of components of the OCN and interconnections between said components.

In some implementations of the system, the controller is further configured to, prior to accessing the DT of the OCN generate the DT of the OCN by receiving, by the controller, a snapshot of the OCN, the snapshot comprising information about hardware and software characteristics of components of the OCN and interconnections between said components.

In some implementations of the system, the predicted optimization level satisfies the criterion in response to the predicted optimization level being above an optimization threshold.

In some implementations of the system, the desired optimization instruction further comprises information about a target optimization value for each of the at least one operational parameters to be optimized; and the optimization threshold is based on the target optimization value.

BRIEF DESCRIPTION OF THE FIGURES

The features and advantages of the present disclosure will become apparent from the following detailed description, taken in combination with the appended drawings, in which.

Figure 1:
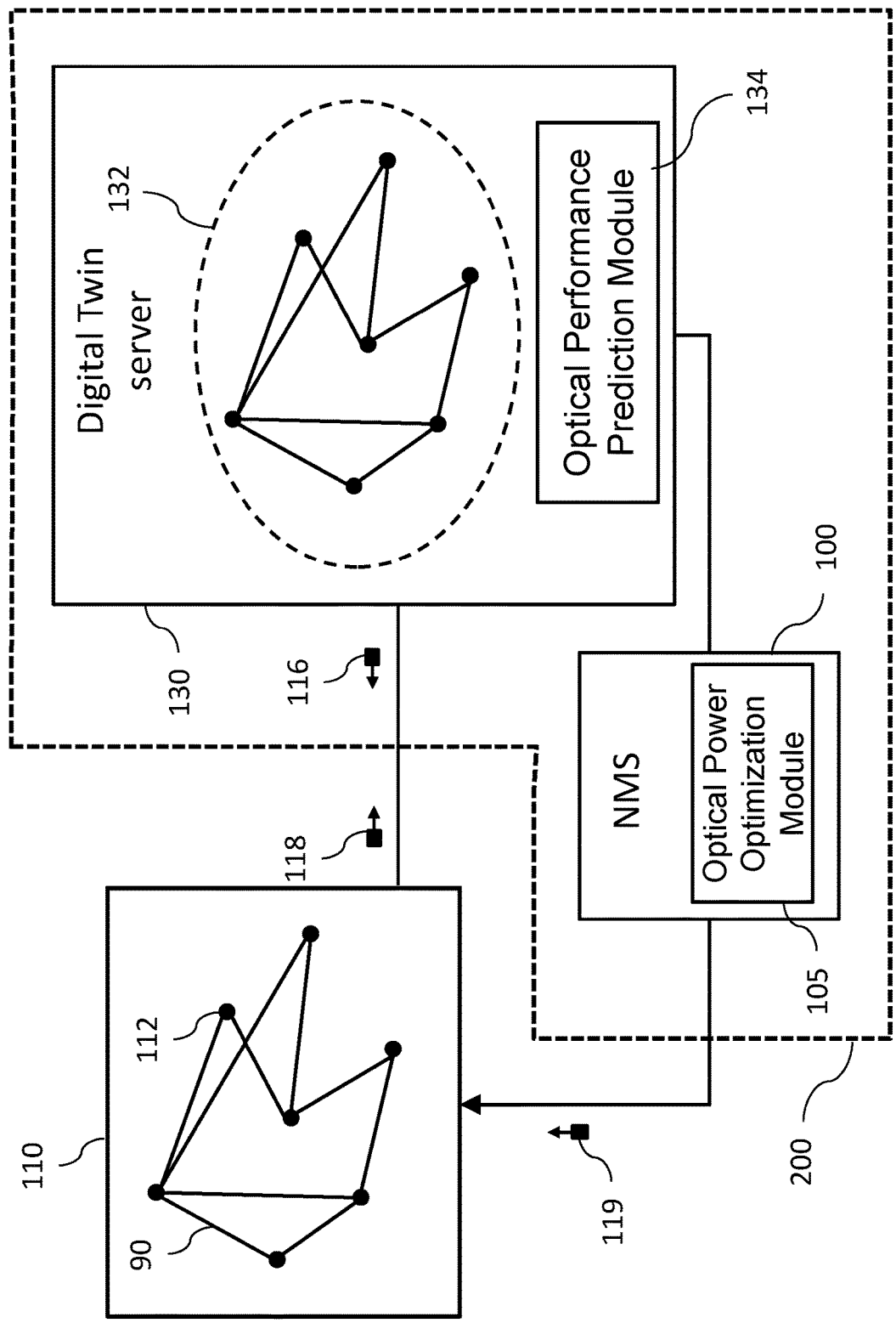
FIG. 1 is a schematic diagram of a system for optimizing optical power management of an optical communication network (OCN) in accordance with some implementations of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments and implementations of the described technology will be described more fully hereinafter with reference to the accompanying drawings, in which representative embodiments and implementations are shown. The present technology concept may, however, be embodied in many different forms and should not be construed as limited to the representative embodiments and implementations set forth herein. Rather, these representative embodiments and implementations are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and implementations and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

Broadly speaking, the present technology provides a system and a method for optimizing optical power management over an optical communication network (OCN). As such, any system variation configured to enhance, increase, optimize or improve performance of an optical communication line can be adapted to execute embodiments and implementations of the present technology, once teachings presented herein are appreciated. Embodiments and implementations of the present technology can be equally applied to other types of the structure and other types of objects to improve performance thereof. In the context of the present disclosure, optimizing optical power management of an optical communication line (OCL) relates to determining optical power at an input of the OCL for each channel of the OCL, determining attenuation functions, gain functions or any other operational characteristics of active and passive components such as filtering functions of Wavelength Selective Switch (WSS), determining paths of optical signals and/or any other action to determine how to increase performances of the OCL and the OCN in general.

With these fundamentals in place, we will now consider some non-limiting examples to illustrate various implementations of aspects of the present disclosure.

FIG. 1 is a high-level, schematic diagram of a system 200 for optimizing optical power management along one or more optical channels 90 of an optical communication network (OCN) 110, in accordance with some implementations of the present technology. In the present implementation, the OCN 110 is a Wavelength Division Multiplexing (WDM) network. In some implementations, it is contemplated that the system 200 could be applied to other types of networks. An optical channel 90 of the OCN 110 is described in greater detail with reference to FIG. 2.

The system 200 includes a Network Managing System (NMS) 100 communicatively and operably connected to the OCN 110. Implementation of the NMS 100 is described in greater details herein after.

The system 200 also includes a Digital-Twin server 130 commutatively connected to the OCN 110 and the NMS 100. The Digital-Twin server 130 may be implemented as a conventional computer server. The Digital-Twin server 130 may be implemented in any other suitable hardware, software, and/or firmware, or a combination thereof. In the depicted non-limiting implementations of the present technology, the Digital-Twin server 130 is a single server. In alternative non-limiting implementations of the present technology, the functionality of the Digital-Twin server 130 may be distributed and implemented via multiple servers. In some implementations, all or some functions of the Digital-Twin server 130 could be performed by the NMS 100.

Generally speaking, the Digital-Twin server 130 is configured to generate and update a digital twin 132 of the OCN 110 based on operational information of the OCN 110. In the context of the present disclosure, the digital twin 132 is a virtual representation of the OCN 110. Data including information about present characteristics of components of the OCN 110 is thus used to update the digital twin 132 such that the digital twin 132 is an accurate and up-to-date digital representation of the OCN 110. The present characteristics of components of the OCN 110 could generally include optical power values measured at the components of the OCN 110, network configurations, network configuration changes, operating states of the components of the OCN 110, identifiers, telemetry data, present and/or pasts values of operational parameters, statistic values, information about failures occurring in the OCN 110, and/or any other information about the OCN 110 suitable for obtaining a reliable and accurate digital copy of the OCN 110, as will be described in further detail below.

It can thus be said that the digital twin 132 models components of the OCN 110 and optical communications therebetween. For example, the Digital-Twin server 130 may, in use, transmit a request signal 116 to some (i.e. a portion) or all components of the OCN 110 for requesting update about operational characteristics and configurations of said components. In response, said components may transmit an update signal 118 including information about their respective present operational characteristics and configurations to the Digital-Twin server 130. The Digital-Twin server 130 may further update the digital twin 132 based on the received update signals 118. It can be said that a snapshot of the portion of the OCN 110 is generated upon receiving the update signals 118, the digital twin 132 being updated based on said snapshot.

The Digital-Twin server 130 executes an Optical Performance Prediction Module (OPPM) 134 to simulate an application of a network configuration on at least a portion of the OCN 110. The OPPM 134 generates a predicted optimization level for network configuration of the at least a portion of the OCN 110. The Digital-Twin server 130 includes one or more processors configured to manage transmission of request signal 116, reception of update signals 118, update of the digital twin 132 and execution of the OPPM 134. In this implementation, execution of the OPPM 134 is made in response to receiving instructions from the NMS 100 to do so.

In this implementation, the NMS 100 executes an Optical Power Optimization Module (OPOM) 105 to determine an optimized configuration of at least one portion of the OCN 110 (a target optical communication line 90). In at least some implementations, the OPOM 105 is a machine learning algorithm (MLA), a reinforcement learning algorithm (RLA) or a heuristic algorithm, and an execution of the OPOM 105 involves executing the OPPM 134 at least once. Execution of illustrative implementations of the OPOM 105, and consequently of the OPPM 134, are described in greater detail herein after.

Upon determining an optimal network configuration, or a "target network configuration", for the at least one portion of the OCN 110, the NMS 100 generates and applies operational instructions 119 to the OCN 110 to modify operational characteristics and configurations of components of said at least one portion to apply the optimal network configuration in order to improve at least some performance of the OCN 110.

Broadly speaking, it can be said that the NMS 100 uses the digital twin 132 hosted on the Digital-Twin server 130 as a safe playground to determine a target network configuration, and further apply said determined target configuration on the OCN 110. The NMS 100 reads telemetry data of the digital twin 132 under a given network configuration to determine whether or not the performances of the OCN 110 would increase in response to applying said given network configuration on the OCN 110. It can thus be said that, instead of directly pushing power adjustments or configurations on the live OCN 110, the NMS 100 may freely explore different solutions (i.e. assess performances of different network configurations) using the digital twin 132, and once a safe and optimal network configuration is found, according to a specified optimization objective function and set of constraints, said network configuration may be applied on the OCN 110.

Figure 2:
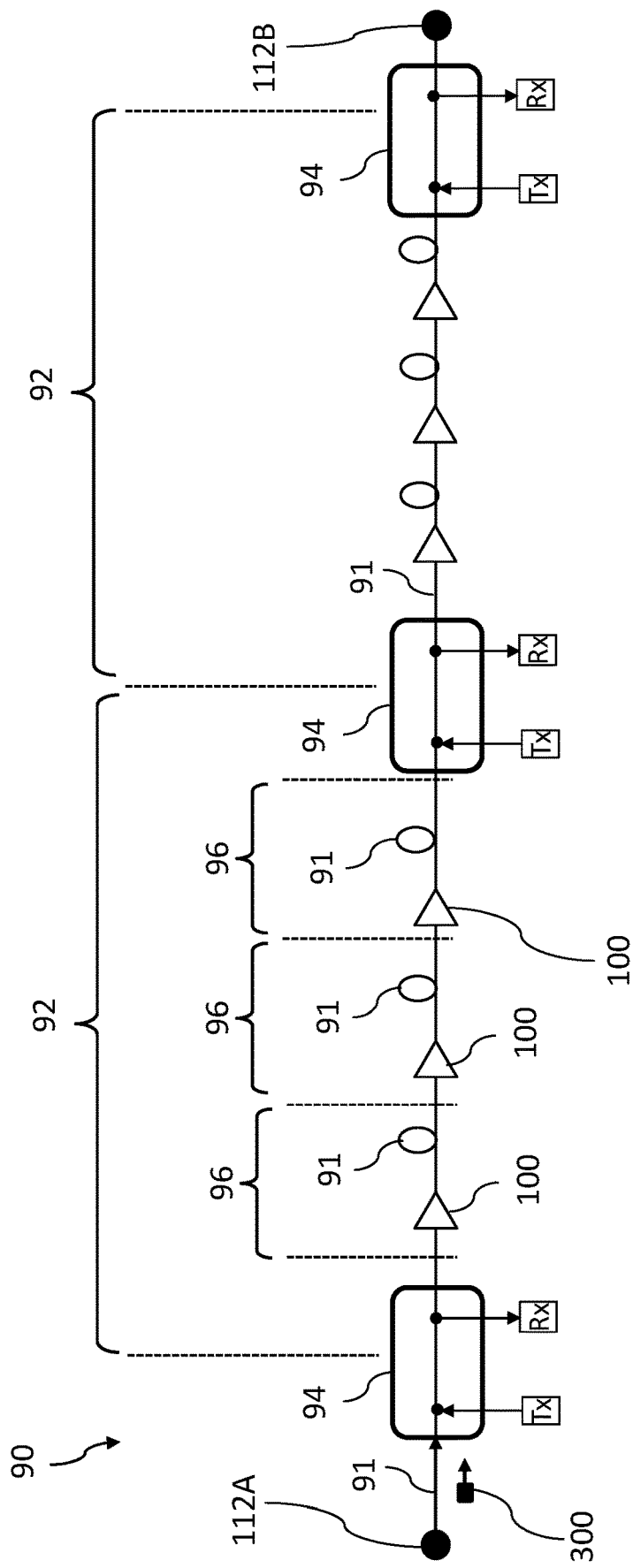
FIG. 2 is a schematic diagram of an optical communication line of the OCN of FIG. 1.

FIG. 2 illustrates an optical communication line (OCL) 90 of the OCN 110. The OCL 90 includes and communicably connects a first network node 112A to a second network node 112B for transmitting an optical signal 300 therebetween. The OCL 90 may include a conventional optical fiber 91 such as, for example, a glass fiber surrounded by one or more coating layers. The optical fiber may be of any suitable type such as, for example, single mode optical fiber, multi-mode optical fiber, standard single mode fibers (SSMFs), large effective area fibers (LEAFs) or the like. The OCL 90 may include an optical fiber core which transmits the optical signal 300, and an optical cladding, which confines the optical signal within the optical fiber core. It is also contemplated that light emitted by the first network node 112A, thereby defining the optical signal 300, may be single polarized, dual polarized, or randomly polarized, may have a particular polarization (e.g. linearly polarized, elliptically polarized, or circularly polarized). In this implementation, a wavelength of the optical signal 300 can be located in one or multiple of the following bands: E—(1400~1470 nm), S—(1470~1520 nm), C—(1520~1565 nm), L—(1565~1630 nm) and U—(1630 nm~1680 nm) bands.

Each of the first and second network nodes 112A, 112B may include a plurality of transmitters and receivers to transmit and receive optical signals such as the optical signal 300. In FIG. 1, the optical signal 300 is emitted by the first network node 112A and received by the second network node 112B. This is merely an illustrative use case scenario of a usage of the OCL 90 and is for illustration purposes only. In an alternative example, the optical signal 300 could be emitted by the second network node 112B and received by the first network node 112A.

For example and without limitation, each transmitter of the first and second network nodes 112A, 112B may be a laser source of a respective wavelength that produces, emits, or radiates pulses of light with certain pulse duration. In certain implementations, one or more transmitters implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The first and second network nodes 112A, 112B may include multiplexers to multiplex signals generated by the transmitters, each multiplexer may be a passive multiplexer such as, without limitation, a prism-based or a mirror-based multiplexer, or an active multiplexer based on a combination of passive components and tunable detectors, each detector being tuned to a specific frequency.

In this implementation, receivers of the first and second network nodes 112A, 112B may include demultiplexers operatively coupled to the optical fiber 91 and configured to receive the optical signal 300 to output a plurality of output signals, each output signal being further directed to a corresponding receiver. For example, a given demultiplexer may be configured to output the output signals based on the wavelength, such that each receiver of a given one of the first and second network nodes 112A, 112B corresponds to one of the transmitters of another one of the first and second network nodes 112A, 112B. Each pair of transmitter/receiver ("Rx/Tx" pair) forms a channel of the OCL 90. It should be noted that a channel of an optical communication network may be carried by a plurality of successive optical communication lines and is relied upon to perform a service provided by an operator of the optical communication network.

As such the OCL 90 includes a plurality of channels. In use, a given demultiplexer may separate the optical signal 300, including the plurality of wavelengths emitted by the plurality of transmitters, into its wavelength components. Said demultiplexer may be a passive multiplexer, such as without limitation a prism-based, diffraction grating-based, or spectral filter-based demultiplexer. In some implementations, the demultiplexer could be an active demultiplexer based on a combination of passive components and tunable detectors, each detector being tuned to a specific frequency.

As shown on FIG. 2, the OCL 90 includes a plurality of optical multiplexing sections (OMSs) 92 for transmitting the optical signal 300. Each OMS 92 includes optical add-drop multiplexers, such as in the present example, a reconfigurable optical add-drop multiplexers (ROADMs) 94 each containing at least one wavelength selective switch (not shown). The ROADMs 94 may include transmitters, denoted "Tx", and receivers, denoted "Rx", to respectively add and drop a given signal from the optical signal 300. Each OMS 92 may then be configured to add, remove, and/or reroute a wavelength of the optical signal 300, via the ROADMs 94. For example and without limitation, each transmitter Tx may be a laser source of a respective wavelength and communicatively connected to a corresponding processing unit (not shown) of the ROADM 94. The laser source may be configured to produce, emit, or radiate pulses of light with certain pulse duration. In certain implementations, one or more transmitters Tx implemented as pulsed laser light sources may include one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The ROADM 94 may be a passive multiplexer such as, without limitation, a prism-based or a mirror-based multiplexer, or an active multiplexer based on a combination of passive components and tunable detectors, each detector being tuned to a specific frequency. Each OMS 92 is formed from multiple optical transport sections (OTSs) 96, where at each OTS 96 the wavelength remains same.

It is noted that the OCL 90 may incorporate additional optical elements, which may include either or both of active and passive elements/modules, including but not limited to: optical amplifiers, optical filters, wavelength selective switches, arrayed waveguide gratings, optical transmitters, optical receivers, processors and other suitable components. However, for purposes of simplicity, these elements have been omitted from FIG. 2.

Each optical transport section 96, also referred to as a link 96, includes an optical amplifier 109 (e.g., erbium-doped fiber amplifiers (EDFAs)) for amplifying the optical signal along the OCL 90 and a length of fiber 91. The optical amplifier of the link 96 could include various amplifiers placed in a sequence for amplifying the optical signal along the OCL 90. According to non-limiting implementations of the present technology, the amplifier of at least one of the OTSs 96 is an optical amplification assembly 100.

Use of one or more additional optical network elements and modules (which may include either or both of active and passive elements/modules), such as, for example, optical filters, arrayed waveguide gratings, optical receiving devices, processors and other suitable components along the OCL 90 is also contemplated in alternative implementations.

Figure 3:
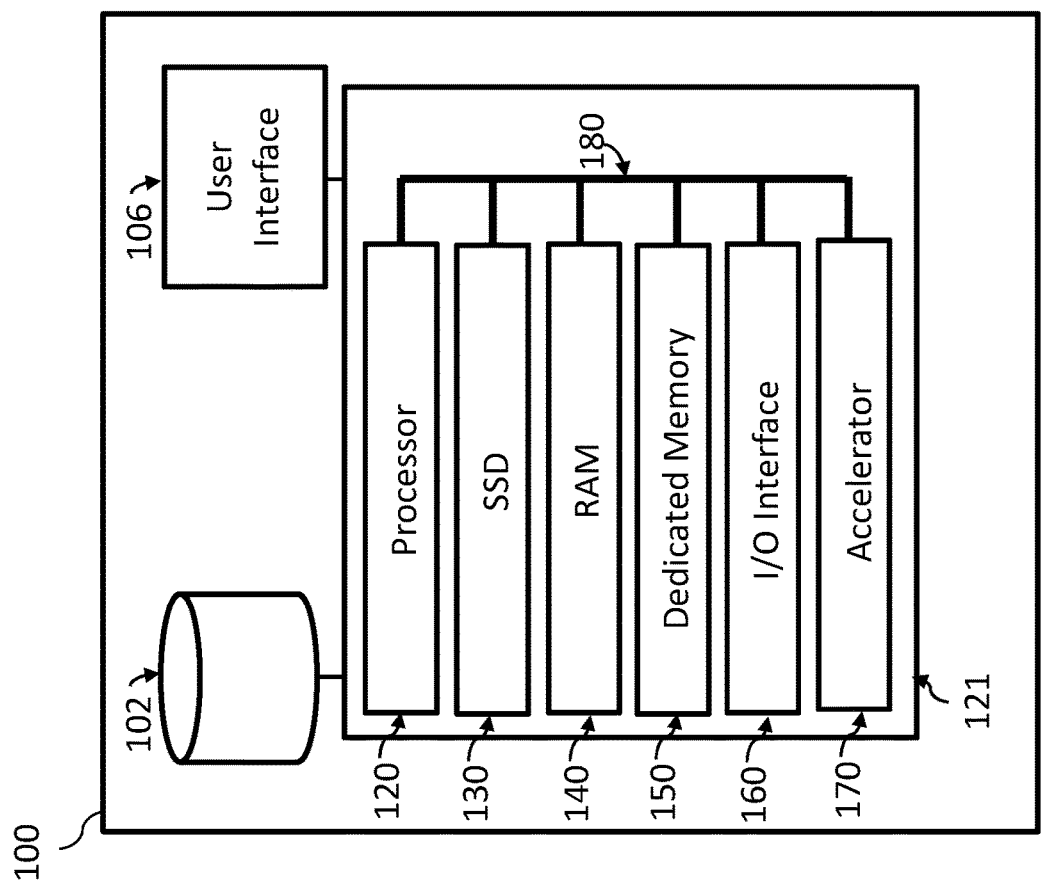
FIG. 3 is a block diagram of a controller of a Network Management System of the system of FIG. 1.

FIG. 3 is a schematic representation of the NMS 100 in accordance with an implementation of the present technology. The NMS 100 includes a computing unit, or controller 121. In some implementations, the controller 121 may be implemented by any of a conventional personal computer, a controller, and/or an electronic device (e.g., a server, a controller unit, a control device, a monitoring device etc.) and/or any combination thereof appropriate to the relevant task at hand. In some embodiments, the controller 121 includes various hardware components including one or more single or multi-core processors collectively represented by a processor 120, a solid-state drive 130, a RAM 140, a dedicated memory 150 and an input/output interface 160. The controller 121 may be a generic computer system.

In some other implementations, the controller 121 may be an "off the shelf" generic computer system. In some implementations, the controller 121 may also be distributed amongst multiple systems. The controller 121 may also be specifically dedicated to the implementation of the present technology. As a person in the art of the present technology may appreciate, multiple variations as to how the controller 121 is implemented may be envisioned without departing from the scope of the present technology.

Communication between the various components of the controller 121 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may include a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 120. Although illustrated as a solid-state drive 130, any type of memory may be used in place of the solid-state drive 130, such as a hard disk, optical disk, and/or removable storage media.

The processor 120 may be a general-purpose processor, such as a central processing unit (CPU) or a processor dedicated to a specific purpose, such as a digital signal processor (DSP). In some implementations, the processor 120 may also rely on an accelerator 170 dedicated to certain given tasks. In some implementations, the processor 120 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the NMS 100 includes a Human-Machine Interface (HMI), or "user interface" 106. The user interface 106 may include a screen or a display capable of rendering indications of outputs of the OPOM 105 and/or the OPPM 134. In this implementation, the display of the user interface 106 includes and/or be housed with a touchscreen to permit users to input data via some combination of virtual keyboards, icons, menus, or other Graphical User Interfaces (GUIs). In some implementations, the display of the user interface 106 may be implemented using a Liquid Crystal Display (LCD) display or a Light Emit-ting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the NMS 100 as in the illustrated implementation of FIG. 3 or located in an external physical location accessible to the user. For example, the user may communicate with the controller 121 (i.e. send instructions thereto and receive information therefrom) by using the user interface 106 wirelessly connected to the controller 121. The controller 121 may be communicate with the user interface 106 via a network (not shown) such as a Local Area Network (LAN) and/or a wireless connexion such as a Wireless Local Area Network (WLAN).

The NMS 100 may include a memory 102 communicably connected to the controller 121 for storing outputs of the OPOM 105 and/or the OPPM 134 for example, and/or operational instructions to be applied. The memory 102 may be embedded in the NMS 100 as in the illustrated implementation of FIG. 3 or located in an external physical location. The controller 121 may be configured to access a content of the memory 102 via a network (not shown) such as a Local Area Network (LAN) and/or a wireless connexion such as a Wireless Local Area Network (WLAN).

The NMS 100 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Generally speaking, the NMS 100 is configured to (i) execute the OPOM 105 to optimize at least a portion of the OCN 110 using at least in part functions of the Digital-Twin server 130 hosting the digital twin 132, thereby determining a target network configuration (ii) generate operational instructions having a predicted optimization level for the at least one portion and (iii) execute the operational instructions to apply the target network configuration on the OCN 110. Implementations and examples of user instructions are described in greater detail herein after. It should be noted that functions of the NMS 100 described herein may be provided by a single dedicated processor, by a single shared computing component, or by a plurality of individual computing components, some of which may be shared.

It should be noted that the controller 121 may be implemented as a conventional computer server. In an example of an implementation of the present technology, the controller 121 may be implemented as a Dell™ PowerEdge™ Server running the Microsoft™ Windows Server™ operating system. Needless to say, the controller 121 may be implemented in any other suitable hardware, software, and/or firmware, or a combination thereof. In the depicted non-limiting implementations of the present technology in FIG. 3, the controller 121 is a single server. In alternative non-limiting implementations of the present technology, the functionality of the controller 121 may be distributed and may be implemented via multiple servers.

Those skilled in the art will appreciate that processor 120 is generally representative of a processing capability that may be provided by, for example, a Central Processing Unit (CPU). In some implementations, in place of or in addition to one or more conventional CPUs, one or more specialized processing cores may be provided. For example, one or more Graphic Processing Units (GPUs), Tensor Processing Units (TPUs), accelerated processors (or processing accelerators) and/or any other processing unit suitable for training and executing an MLA may be provided in addition to or in place of one or more CPUs. In this implementation, the processing unit 120 of the controller 121 is a Graphical Processing Unit (GPU) and the dedicated memory 140 is a Video Random access Memory (VRAM) of the processing unit 120. In alternative implementations, the dedicated memory 140 may be a Random Access Memory (RAM), a Video Random Access Memory (VRAM), a Window Random Access Memory (WRAM), a Multibank Dynamic Random Access Memory (MDRAM), a Double Data Rate (DDR) memory, a Graphics Double Data Rate (GDDR) memory, a High Bandwidth Memory (HBM), a Fast-Cycle Random-Access Memory (FCRAM) or any other suitable type of computer memory.

In one aspect of the present technology, there is provided method for optimizing one or more operational parameters of a portion (e.g. an optical channel) of the OCN 110, for example of the optical communication line 90. For example and without limitations, the one or more operational parameters may be an Optical Signal-to-Noise Ratio (OSNR), an Optical Signal-to-Noise Ratio Loss (OSNRL), a Generalized Signal-to-Noise Ratio (GSNR), a Generalized Signal-to-Noise Ratio Loss (GSNRL), a Bit Error Rate (BER) or a combination thereof. Methods for optimizing one or more operational parameters of the optical communication line 90 are described with reference to FIGS. 4 to 8.

Figure 4:
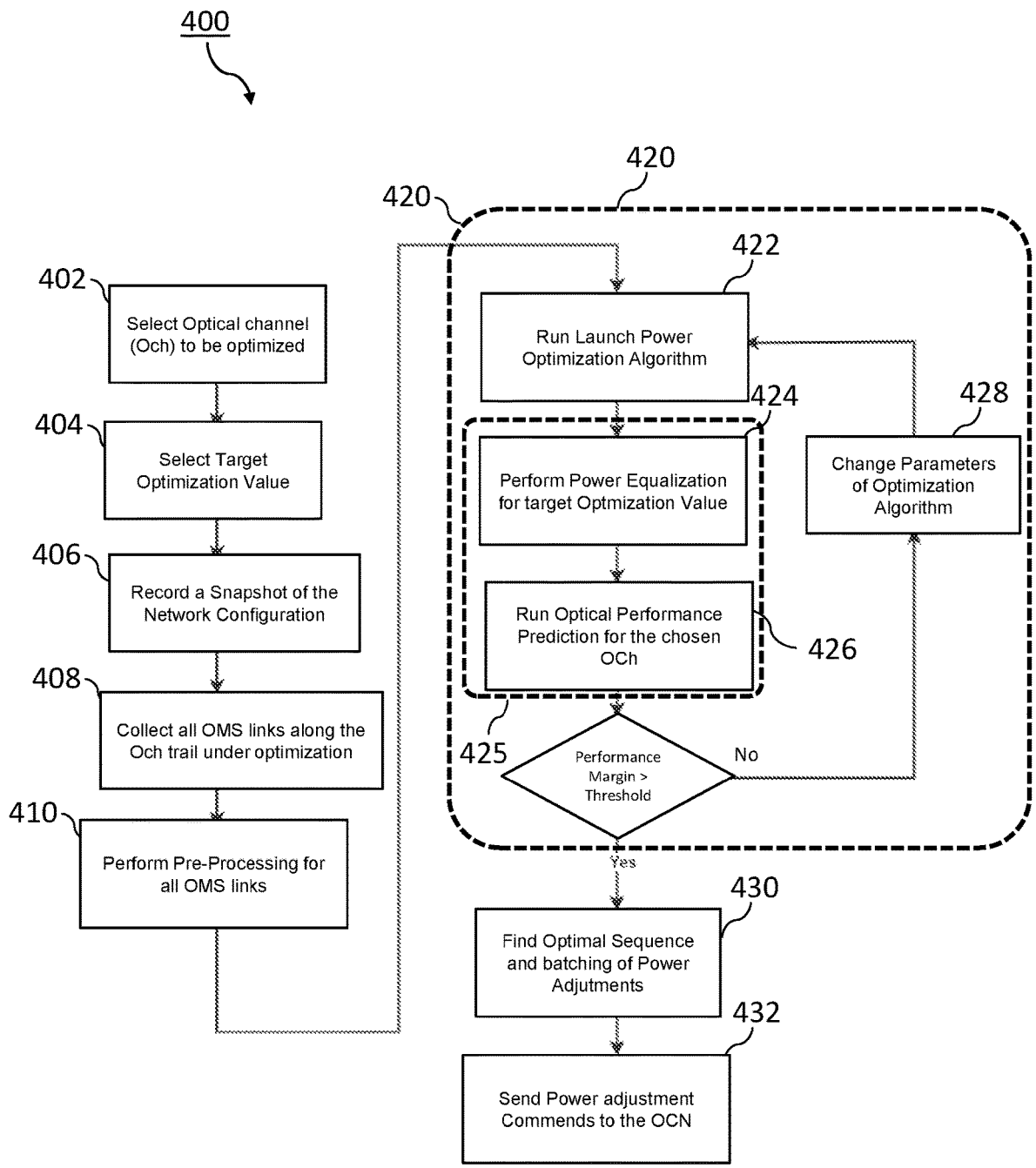
FIG. 4 is a flow chart showing operations of a method for optimizing power equalization in an optical communication line of an OCN in accordance with some implementation of the present technology.

FIG. 4 is a flow chart showing operations of a method 400 for optimizing power equalization in a portion of the OCN 110 in accordance with some implementations of the present technology. The method 400 is executed by the system 200. In the illustrative implementation of FIG. 4, the portion of the OCN 110 is an optical channel of the optical communication line 90.

The method 400 begins with receiving, from a user of the NMS 100, an indication of a selected optical channel, at operation 402. For example, the user may select the optical channel to be optimized via the user interface 106. In some implementations, the user may select one or more optical channels of the optical communication line 90 to be optimized. In this implementation, operation 402 is performed by the NMS 100.

The method 400 continues with receiving, from the user, an indication of at least one operational parameter to be optimized, which is optical power equalization in the implementation of FIG. 4, and a target optimization value for the power equalization of the selected optical channel at operation 404. Combination of the target optimization value and the indication of the selected optical channel is referred to as a received "desired optimization instruction" from the user. In this implementation, operation 404 is performed by the NMS 100.

The method 400 may continue, at operation 406, with recording a snapshot of the selected optical channel before the selected optical channel is modified. The snapshot may thus be used as a reference and/or for potential rollbacks. A snapshot of the optical communication lines including the optical channel to be optimized may also be recorded to update the digital twin 132 at operation 406. In this implementation, operation 406 is performed by the NMS 100.

The method 400 continues with collecting, at operation 408, information about localization and identification of each modelled OMS along the optical communication line 90 of the OCN 110 to be optimized. In this implementation, operation 408 is performed by the Digital-Twin server 130.

The method 400 continues with performing, at operation 410, a pre-processing operation on the optical channel as replicated in the digital twin 132. For example, a line compensation operation may be applied to each modelled OMS of the optical channel. More specifically, configuration of modelled components (e.g. optical amplifiers 100 of the OCN 110) along the optical channel may be adjusted to compensate for loss that occurs along spans of optical fiber 91. In this implementation, operation 410 is performed by the Digital-Twin server 130.

The method 400 then continues with executing, at operation 420, the OPOM 105. More specifically, execution of the OPOM 105 includes in this implementation, at operation 422, running a launch power optimization algorithm. An objective of the launch power optimization algorithm is to tune total optical power level at an input of a first amplifier of each OMS modelled by the digital twin 132 close to a nominal value. In this implementation, operation 422 is performed by the Digital-Twin server 130.

Execution of the OPOM 105 further continues the method 400 with executing, at operation 425, the OPPM 134 by the Digital-Twin server 130. Broadly speaking, executing the OPPM 134 at operation 425 enables simulation of per-channel optical power tuning to optimize the OCL 90. In the present case, execution of the OPPM 134 includes performing, at operation 424, a power equalization based on the received target optimization value. The target optimization value may be indicative of a desired optical power value to which the optical power of the channels is to be equalized. In this implementation, the target optimization value may be indicative of a target power value and a target margin around the target power value. For example, the target power value may be 20 W, and the target margin may be +−5%, thereby defining a first threshold at 19 W and a second threshold at 21 W. In this implementation, operation 424 is performed by the Digital-Twin server 130.

In use, the system 200 determines a first network configuration that is expected to increase performance of the optical channel with respect to the operational parameter (e.g. power equalization) and in view of the target optimization value. Operation 424 thus enables the OPOM 105 to simulate application of a network configuration on the OCN 110 using the digital twin 132. A network configuration is thus applied on the digital twin 132, said network configuration being expected to have increased performances with respect to power equalization. Expected performances are further determined based on the digital twin 132.

Execution of the OPOM 105 further continues with determining, at operation 426, a predicted optimization level for the optical communication channel 90, the predicted optimization level being associated with the network configuration. The predicted optimization level may be indicative of a difference between the expected performances determined using the digital twin 132, and the target optimization value. For example, if determination is made that, in response to a given network configuration being applied onto the optical channel of the digital twin 132, the optical power of the optical channel is between the first and second thresholds (i.e. between 19 and 21 W), the predicted optimization value may be relatively high. However, if determination is made that, in response to a given network configuration being applied onto the optical channel of the digital twin 132, the optical power of the optical channel is outside a range defined between the first and second thresholds, the predicted optimization value may be relatively low. In this implementation, operation 426 is performed by the Digital-Twin server 130.

In response to the predicted optimization level not satisfying a pre-determined criterion, the system 200 determines another network configuration of the optical channel of the digital twin 132 at operation 428 to further increase the expected performances with respect to power equalization by changing parameters of the OPPM 134. In this implementation, the optimization threshold is based on the target optimization value. Execution of the OPOM 105 thus loops back to operation 422. In other words, the OPOM 105 adjusts the network configuration that is tested onto the digital twin 132 to increase expected performances of the optical channel with respect to the operational parameter. As is mentioned above, the OPOM 105 is a Machine Learning algorithm (MLA), a reinforcement learning algorithm (RLA) or a heuristic algorithm, trained for adjusting a network configuration to increase performances of one or more optical channels with respect to at least one operational parameter. The OPOM 105 thus determines, by employing the OPPM 134 once again, a new network configuration associated with a new predicted optimization level. In this implementation, operation 428 is performed by the Digital-Twin server 130.

In response to the predicted optimization level satisfying the pre-determined criterion, the network configuration is identified as a target network configuration and the system 200 may determine an optimal sequence of adjustments to be executed on the OCN 110 to apply the target network configuration at operation 430. More specifically, a sequence of modification to be applied to the components of the optical communication line 90 is determined by the system 200, an application of said sequence on the OCN 110 causing application of the target network configuration. In use, the system 200 generates operational instructions for applying the target network configuration on the OCN 110. In this implementation, operation 430 is performed by the Digital-Twin server 130.

Broadly speaking, a given network configuration is identified as the target network configuration in response to the corresponding predicted optimization level satisfying a criterion. In this implementation, the predicted optimization level satisfies the criterion when the predicted optimization level is above an optimization threshold. A comparison of the predicted optimization level with the optimization threshold is not a limitative operation to identify the target network configuration. The method 400 ends at operation 432 with executing the operational instructions to apply the target network configuration on the OCN 110. It should be understood that no modification of the OCN 110 occurs before operation 432. As such, experimental and provisional changes to the OCN 110 are avoided, as well as potential rollback of those changes. Unnecessary changes to the OCN 110 are thus avoided and the number of power adjustment rounds are reduced. In this implementation, operation 432 is performed by the NMS 100.

In other aspects of the present technology, operational parameters other than power equalization may be optimized. FIGS. 5 to 8 illustrate alternative implementations of methods for optimizing other operational parameters of a selected optical channel, according to the present technology.

Figure 5:
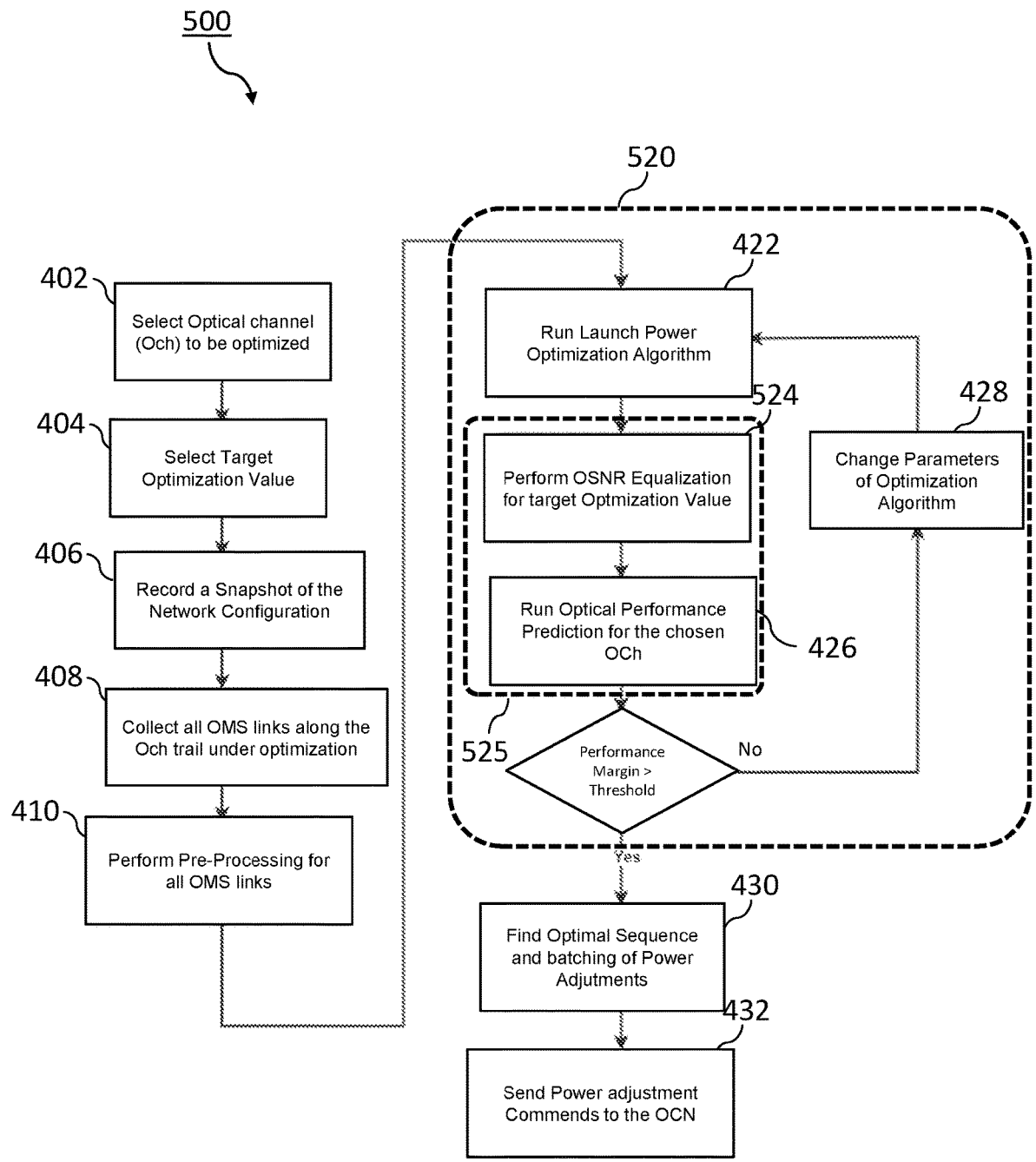
FIG. 5 is a flow chart showing operations of a method for optimizing optical signal-to-noise ratio (OSNR) equalization of an optical channel of an OCN in accordance with some implementation of the present technology.

With reference to FIG. 5, a method 500 for optimizing optical signal-to-noise ratio (OSNR) of an optical channel of the OCN 110 is illustrated in accordance with some implementations of the present technology. Operations of the method 500 that are similar to those of the method 400 retain the same reference numeral and will generally not be described again.

In method 500, the target optimization value included in the desired optimization instruction received at operation 404 includes an optical signal-to-noise ratio (OSNR) target value and a first and a second related thresholds. The method 500 includes performing, at operation 524, an OSNR equalization onto the optical channel. In other words, the system 200 determines a network configuration which increases performances of the optical channel in view of the OSNR. The optical channel under the network configuration is expected to have an OSNR value to be closer to the OSNR target value than under a previous network configuration. In this implementation, operation 524 is performed by the Digital-Twin server 130.

Broadly speaking, the method 500 may be executed to optimize performances of a selected optical channel in view of an OSNR thereof.

Figure 6:
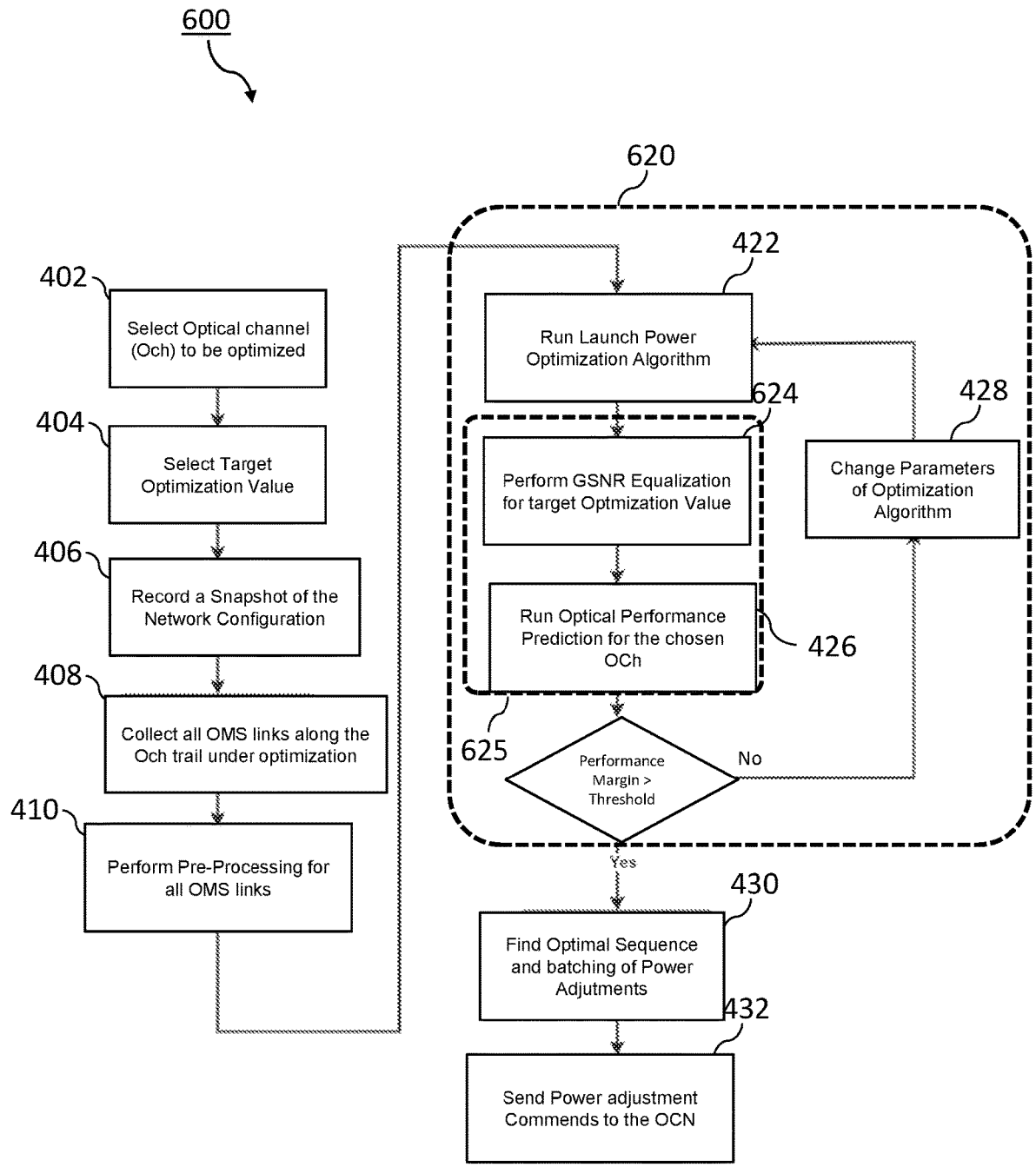
FIG. 6 is a flow chart showing operations of a method for optimizing generalized optical signal-to-noise ratio (GSNR) equalization of an optical channel of an OCN in accordance with some implementations of the present technology.

With reference to FIG. 6, a method 600 for optimizing generalized optical signal-to-noise ratio (GSNR) of an optical channel of the OCN 110 in accordance with some implementations of the present technology is illustrated. Operations of the method 600 that are similar to those of the method 400 retain the same reference numeral and will generally not be described again.

In method 600, the target optimization value included in the desired optimization instructions received at operation 404 includes a GSNR target value and a first and second related thresholds (e.g. the first related threshold may be 105 percent of the GSNR target value, and the second related threshold may be 95 percent of the GSNR value). The method 600 includes performing, at operation 624, a GSNR equalization onto the optical channel. In other words, the system 200 determines a network configuration which increases performances of the optical channel in view of the GSNR. The optical channel under the network configuration is expected to have a GSNR value to be closer to the GSNR target value than under a previous network configuration. In this implementation, operation 624 is performed by the Digital-Twin server 130.

Broadly speaking, the method 600 may be executed to optimize performances of a selected optical channel in view of a GSNR thereof.

Figure 7:
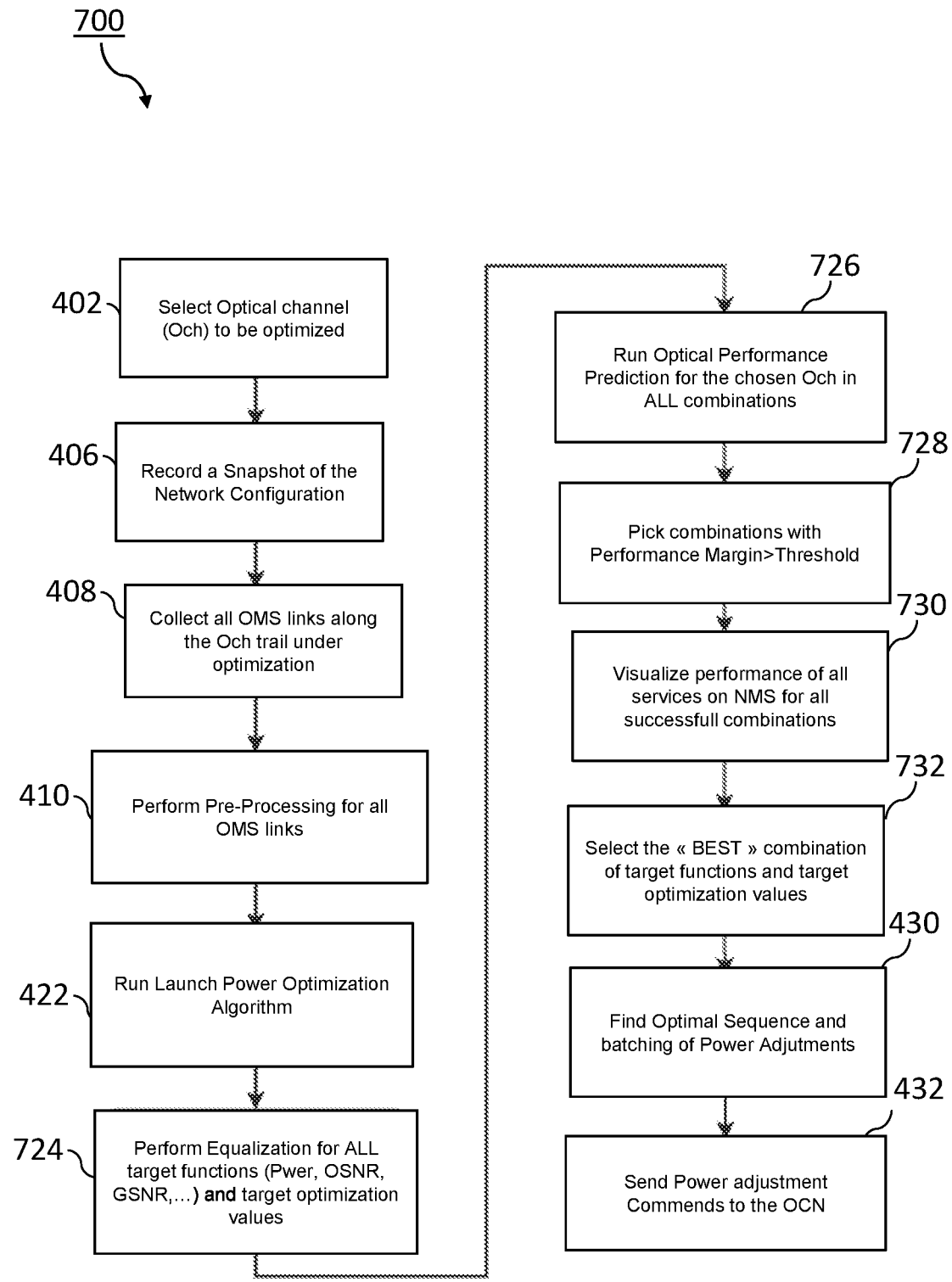
FIG. 7 is a flow chart showing operations of a method for optimizing operational parameters of an optical channel of an OCN in accordance with some implementations of the present technology.

FIG. 7 is a flow diagram showing operations of a method 700 for optimizing a combination of a plurality of operational parameters of an optical channel of an OCN in accordance with some implementations of the present technology. Operations of the method 700 that are similar to those of the method 400 retain the same reference numeral and will generally not be described again.

In this implementation, a plurality of operational parameters of a same optical channel are to be optimized. As such, each operational parameter is associated with a corresponding target optimization value. A function of the OPOM 105 is to optimize performances of the optical channel in view of a combination of the plurality of the operational parameters. For example, if a given optical channel is to be optimized in view of OSNR and power equalization, the OPOM 105 is expected to determine a network configuration that would lead to increased performances of the optical channel in view of both OSN and power equalization, even if another network configuration would lead to even higher performances for OSNR or power equalization alone.

Execution of the OPOM 105 includes, subsequent to operation 422, performing, at operation 724 of the method 700, an equalization on all the operational parameters to be optimized according to the desired optimization instructions. The OPOM 105 may thus determine a plurality of network configurations that increase performances of the optical channel in view of the plurality of operational parameters. The OPOM 105 determines a predicted optimization level for each of said determined network configuration at operation 726. The controller 121 further identifies the network configuration having their corresponding predicted optimization level satisfying a criterion (e.g. above a threshold, or between the first and second thresholds) at operation 728. In this implementation, operations 724, 726 and 728 are performed by the Digital-Twin server 130. The controller 121 provides the network configurations identified at operation 730 to the user via the user-interface 106, along with the predicted optimization levels and expected performances of the OCN 110. The user may select a given network configuration among the provided network configurations at operation 732. The selected network configuration is identified as the target network configuration to be applied on the OCN 110. In this implementation, operations 730 and 732 are performed by the NMS 100.

Figure 8:
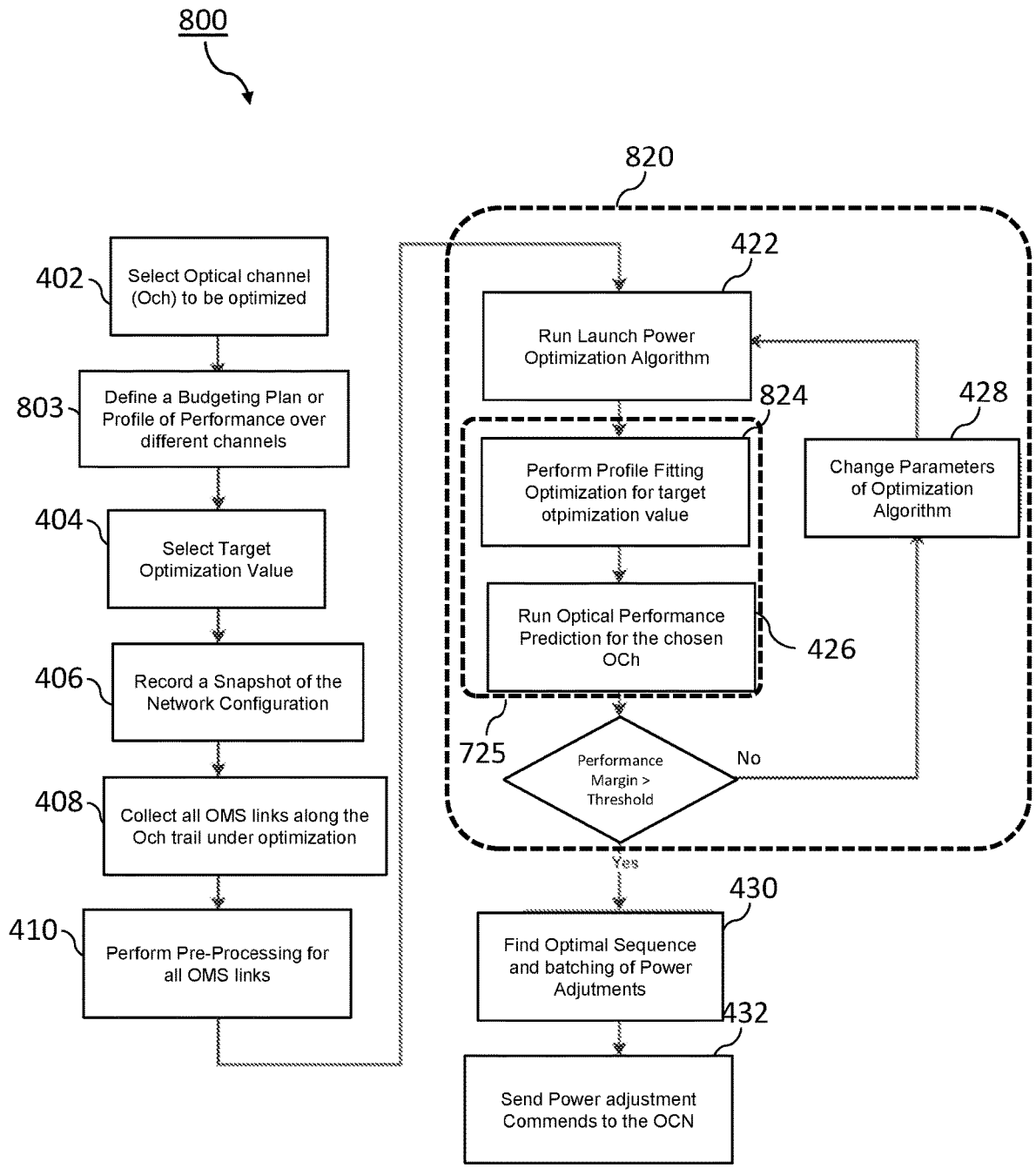
FIG. 8 is a flow chart showing operations of a method for optimizing optical power profile fitting of an optical channel of an OCN in accordance with some implementations of the present technology.

FIG. 8 is a flow diagram showing operations of a method 800 for optimizing optical power profile fitting of an optical channel of an OCN in accordance with some implementations of the present technology. Operations of the method 800 that are similar to those of the method 400 retain the same reference numeral and will generally not be described again.

Subsequent to operation 402, the method 800 includes defining, at operation 803, a target profile of performance over a plurality of selected channels of the OCN 110. For example, the plurality of channels may be included in a same optical communication line 90. Information about the target profile of performance may be included in the desired optimization instruction received from the user. In this implementation, operation 803 is performed by the NMS 100.

The method 800 includes performing, at operation 824, a Profile Fitting optimization onto the plurality of selected optical channels. In other words, the system 200 determines a network configuration which increases performances of the optical channel in view of the target profile. In this implementation, the OPOM 105 has been trained or programmed to determine a network configuration that realizes a provided Performance Budgeting Plan, or "Profile of Performance" (e.g. OSNR, GSNR) over different optical channels. In this implementation, operation 824 is performed by the Digital-Twin server 130.

Broadly speaking, the method 800 may be executed to optimize performances of a selected optical channel in view of a target profile of performance thereof.

Figure 9:
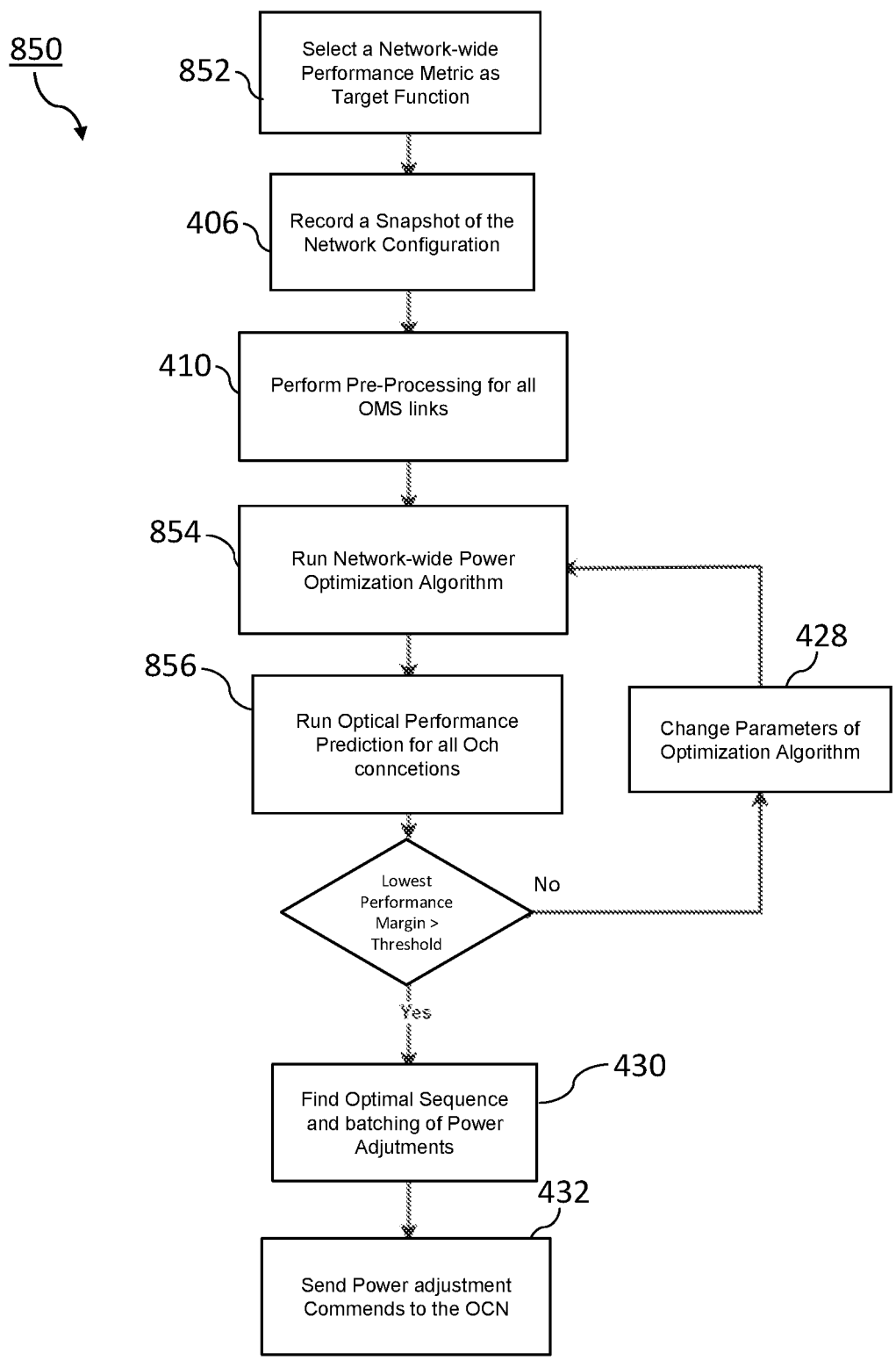
FIG. 9 is a flow chart showing operations of a method for performing a network-wide optimization of an OCN in accordance with some implementations of the present technology.

FIG. 9 is a flow diagram showing operations of a method 850 for performing a network-wide optimization of the OCN 110 in accordance with some implementations of the present technology. Operations of the method 850 that are similar to those of the method 400 retain the same reference numeral and will generally not be described again.

The method 850 starts with selecting, at operation 852, a network-wide performance metrics as a target function. The network-wide performance is indicative of a quality of all services operated by the OCN 110 on a global scale. The target function may be an operational parameter such as a bit rate of a communication or any other parameters characterizing a quality of a communication network in delivering all services. The network-wide performance may be for example selected by a user of the NMS 100. In this implementation, operation 852 is performed by the NMS 100.

Subsequent to operation 410, the method 850 includes executing, at operation 854, a Network-wide Power Optimization Algorithm. In other words, the system 200 determines a network configuration which increases performances (e.g. maximizes or minimizes the selected network-wide performance metrics) of the OCN 110 in view of the target profile. In this implementation, the Network-wide Power Optimization Algorithm has been trained or programmed to determine a network configuration that optimizes the selected network-wide performance metrics over all services of the OCN 110. In this implementation, operation 854 is performed by the Digital-Twin server 130. The method 850 further includes executing, at operation 856, the OPPM 134 to simulate an application of a network configuration on the entire OCN 110. As previously described, the OPPM 134 generates a predicted optimization level for network configurations of the entire OCN 110. In response to the predicted optimization level of the given network configuration not satisfying a pre-determined criterion (e.g. a lowest performance margin of the network configuration being below a pre-determined threshold), the method 850 continues with operation 428. In response to the predicted optimization level of the given network configuration satisfying the pre-determined criterion (e.g. a lowest performance margin of the network configuration being above a pre-determined threshold), the method 850 continues with operation 430

Broadly speaking, the method 850 may be executed to perform a global optimization over all running services of the OCN 110.

Figure 10:
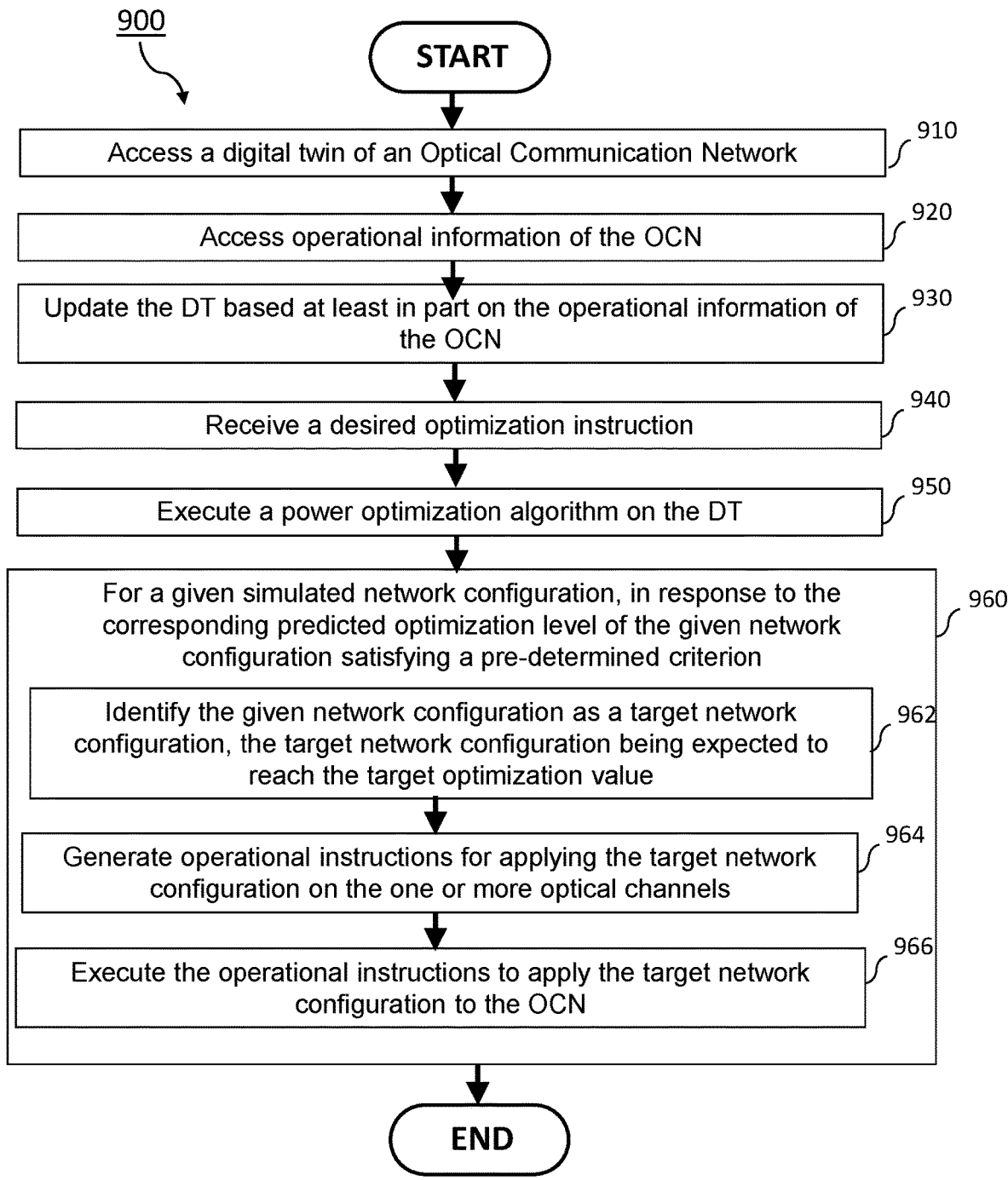
FIG. 10 is a flow chart showing operations of a method for optimizing optical power management along optical communication lines of an OCN in accordance with some implementations of the present technology.

With reference to FIG. 10, a method 900 for optimizing optical power management along one or more optical channels of the optical communication network (OCN) 110 is illustrated. In one or more aspects, the method 900 is performed by the system 200, the controller 121 and/or any other device that may be communicably and operably connected to the OCN 110. In some implementations, one of more operations of the method 900 could be implemented, in whole or in part, by another computer-implemented device. It is also contemplated that the method 900 or one or more operation thereof may be embodied in computer-executable instructions that are stored in a computer-readable medium, such as a non-transitory mass storage device, loaded into memory and executed by a processor, such as the controller 121 included in the Network Management System 100 operatively connected to the components of the OCN 110. Some operations or portions of operations in the flow diagram may be possibly being executed concurrently, omitted or changed in order. In some implementations, the OCN 110 is a Wavelength Division Multiplexing (WDM) network.

The method 900 begins with accessing, at operation 910, the digital twin (DT) 132 of the OCN 110. As is mentioned above, the DT 132 is configured to model components of the OCN 110 and optical communications therebetween, the DT 132 having been generated based at least in part on an initial architecture of the OCN 110. In some implementations, the controller 121 accesses the DT 132 by receiving a snapshot of the OCN 110, the snapshot including information about hardware and software characteristics of components of the OCN 110 and interconnections between said components. In the same or other implementations, the controller 121 causes generation of the DT 132 prior to accessing information thereof. Generation of the DT 132 may also be made by receiving a snapshot of the OCN 110. Said snapshot further includes information about hardware characteristics (e.g. boards, devices, components types and models), software characteristics (e.g. nodes, link) and services hosted and supported by the components of the OCN 110.

The method 900 continues with accessing, at operation 920, operational information of the OCN 110. Said operational information may include information about optical power values measured at the components of the OCN 110, network configurations, network configuration changes, operating states of the components of the OCN 110, identifiers, telemetry data, present and/or pasts values of operational parameters, statistic values, information about failures occurring in the OCN 110, and/or any other information about the OCN 110 suitable for obtaining a reliable and accurate digital copy of the OCN 110.

The method 900 continues with updating, at operation 930, the DT 132 based on the operational information. For example, characteristics of a component of the DT 132 that models a corresponding component of the OCN 110 may be accordingly modified in response to accessing new information about said component of the OCN 110. In this implementation, instant operational information about the OCN 110 is continuously accessed. In response to accessing the instant operational information, the DT 132 is updated based on the instant operation information such that the DT 132 is continuously updated and provides a near-to-real-time digital representation of the OCN 110.

The method 900 continues with receiving, at operation 940, desired optimization instructions. In some implementations, the desired optimization instructions are submitted by a user of the system to the controller. The desired optimization instructions include an identification of the one or more optical channels of the OCN 110 to be optimized, at least one operational parameter to be optimized, and a target optimization value for each of the at least one operational parameter to be optimized. For example and without limitations, an operational parameter may be an Optical Signal-to-Noise Ratio, an Optical Signal-to-Noise Ratio Loss, a Generalized Signal-to-Noise Ratio Loss, a Generalized Signal-to-Noise Ratio, or a Bit Error Rate of a given optical channel to be optimized.

The method 900 continues with executing, at operation 950, the optical power optimization module (OPOMM) 105 based on the received desired optimization instructions. In this implementation, the execution of the OPOM 105 includes simulating application of at least one network configuration of the at least one optical channel of the OCN 110. The OPOM 105 generates a predicted optimized level for each network configuration whose application on the OCN 110 is simulated on the DT 132. The predicted optimized level is indicative of expected performances of the at least one optical channel of the OCN 110 for the corresponding network configuration.

In this implementation, the OPOM 105 is a Machine Learning algorithm (MLA), a reinforcement learning algorithm (RLA) or a heuristic algorithm and has been trained to adjust a network configuration to increase performances of the one or more optical channels with respect to the at least one operational parameter indicated in the desired optimization instructions. For example, in response to the desired optimization instructions being indicative of the Optical Signal-to-Noise Ratio (OSNR) being the operational parameter to be optimized, the OPOM 105 may execute an OSNR equalization as described at operation 524 of the method 500. As another example, in response to the desired optimization instructions being indicative of the power equalization being the operational parameter to be optimized, the OPOM 105 may execute a power equalization as described at operation 424 of the method 400. As yet another example, in response to the desired optimization instructions being indicative of the Generalized Signal-to-Noise Ratio (GSNR) being the operational parameter to be optimized, the OPOM 105 may execute a GSNR equalization as described at operation 624 of the method 400.

In some implementations, an indication of the predicted optimization level is provided by the controller 121 to the user via the user-interface 106.

The method 900 continues with determining, at operation 960 and for each network configuration whose application is simulated on the DT 132, whether the predicted optimized level satisfies a criterion. In some implementations, the criterion is generated based on the target optimization value included in the desired optimization instructions. For example, if the desired optimization instructions indicate that optical power of a given optical channel is to be equalized to a given target power value, the target optimization value may also include information about desired margins for the difference between measured optical power and the target power value (e.g. +−5% of the target power value). In this scenario, the criterion is satisfied when the measured power value that is estimated using the DT 132 is equal to the target power value with a +−5% margin.

In response to the predicted optimized level satisfying the criterion, the method 900 continues with identifying, at operation 962, the network configuration corresponding to the predicted optimized level as a target network configuration, the target network configuration being thus expected to reach the target optimization value upon being applied on the OCN 110. As an example, a given predicted optimization level may satisfy the criterion in response to being above an optimization threshold, the optimization threshold being based on the target optimization value.

In this implementation, in response to the predicted optimization level of a given network configuration not satisfying the criterion, the OPOM 105 adjusts the given network configuration, thereby defining a new network configuration and generates a modified predicted optimization level based on the new network configuration. The OPOM 105 may continue to adjust the network configuration of the DT 132, thereby generating new network configurations, until a network configuration is found having a corresponding predicted optimization level satisfying the criterion. If no network configuration is found having its corresponding predicted optimization level satisfying the criterion, the controller 121 may identify the network configuration having the highest predicted optimization level as the target network configuration and provide indication of the target network configuration to the user via the user-interface 106 along with its corresponding predicted optimization level and expected performances of the OCN 110 for validation of the target network configuration.

In some implementations, the desired optimization instructions include information about a desired concurrent optimization of a plurality of operational parameters. For example, a user may desire to optimize both OSNR and GSNR of a same optical channel. In these implementations, an execution of the OPPM 134 includes determining a plurality of network configurations and a plurality of expected optimization level, each network configuration being associated with a corresponding expected optimization level. The controller 121 further provides the network configurations that may be applied on the OCN 110 along with the corresponding expected optimization levels via the user-interface 106. The controller 121 may further receive from the user via the user-interface 106, indication of a selected network configuration among the network configurations. The selected network configuration is then identified as the target network configuration to be further applied on the OCN 110.

In some implementations, the predicted optimization level of each of the network configurations that may be applied on the OCN 110 is provided to the user via the user-interface 106 such that the user may select a given network configuration based on a user's subjective judgment. In these implementations, a given predicted optimization level satisfies the criterion in response to being selected by the user among the predicted optimization levels. In the same or other implementations, the predicted optimization levels and the corresponding network configurations for which the predicted optimization level satisfies another criterion (e.g. is above a pre-determined threshold) are provided to the user for selection.

The method 900 further continues with generating, at operation 964, operational instructions for applying the target network configuration on the one or more optical channels of the OCN 110. In other words, the controller 121 determines operational instructions to be executed such that a current network configuration of the OCN 110 matches the target network configuration upon executing the operational instructions. In use, the operational instructions may include instruction for specific components (e.g. optical amplifiers, optical power sources or WSS) to modify their configuration, status, or any other parameters. In some implementations, the controller 121 determines a sequence of adjustments for producing the target network configuration at the OCN 110.

The method 900 ends with executing, at operation 966, the operational instructions to apply the target network configuration on the OCN 110. In some implementations, the controller 121 executes the operational instructions by applying the sequence of adjustments to the OCN 110.

It is contemplated that operations of the method may be performed in a continuous and/or repeated manner. In this implementation, the operational information of the OCN 110 is continuously accessed by the controller 121 and the digital twin 132 is continuously updated based on the accessed operational information in order to maintain an accuracy of the representation of the OCN 110 by the digital twin 132. The method 900 or portions thereof may also be repeatedly performed (e.g. at a pre-determined frequency or in response to receiving instructions to do so). As such, optimization of the OCN 110 or portions thereof may be continuously performed by determining and applying new target network configurations.

It will be appreciated that at least some of the operations of the methods 400, 500, 600, 700, 800, 850 and 900 may be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It is to be understood that the operations and functionality of the described system 200, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for optimizing optical power management over one or more optical channels of an optical communication network (OCN), the OCN comprising a plurality of optical channels, the method being performed by a controller connected to the OCN, the method comprising:
   accessing a digital twin (DT) of the OCN, the DT being configured to model components of the OCN and optical communications therebetween, the DT having been generated based at least in part on an initial architecture of the OCN;
   accessing operational information of the OCN, the operational information of the OCN comprising information about optical power values of the one or more optical channels, network configurations and operational parameters thereof;
   updating the DT based at least in part on the operational information of the OCN;
   receiving a desired optimization instruction comprising information about:
      an identification of the one or more optical channels, and
      at least one operational parameter to be optimized;
   executing an optical power optimization module on the DT, execution of the optical power optimization module comprising:
      simulating application of at least one network configuration of the at least one optical channel, each network configuration having a corresponding predicted optimized level indicative of expected performances of the at least one optical channel for the corresponding network configuration;
      for a given simulated network configuration, in response to the corresponding predicted optimization level of the given network configuration satisfying a pre-determined criterion:
         identifying the given network configuration as a target network configuration, the target network configuration being expected to satisfy the pre-determined criterion;
         generating operational instructions for applying the target network configuration on the one or more optical channels, and
         executing the operational instructions to apply the target network configuration on the OCN.

2. The method of claim 1, wherein:
   generating the operational instructions comprises determining a sequence of adjustments for producing the target network configuration to be applied on the OCN; and
   executing the operational instructions comprises applying the sequence of adjustments on the OCN.

3. The method of claim 1, wherein the OCN is a Wavelength Division Multiplexing (WDM) network.

4. The method of claim 1, wherein the desired optimization instruction is submitted by a user of the system to the controller.

5. The method of claim 1, further comprising, for a given network configuration, in response to the corresponding predicted optimization level not satisfying the criterion:
   adjusting the given network configuration, thereby defining a new network configuration; and
   generating, based on the new network configuration, a modified predicted optimization level.

6. The method of claim 5, wherein the optical power optimization module is a Machine Learning algorithm (MLA), a reinforcement learning algorithm (RLA) or a heuristic algorithm, the optical power optimization module having been trained to adjust a network configuration to increase performances of the one or more optical channels with respect to the at least one operational parameter.

7. The method of claim 1, wherein the at least one operational parameter comprises at least one of:
   Optical Signal-to-Noise Ratio,
   Optical Signal-to-Noise Ratio Loss,
   Generalized Signal-to-Noise Ratio Loss,
   Generalized Signal-to-Noise Ratio, and
   Bit Error Rate.

8. The method of claim 1, further comprising:
   continuously accessing instant operational information of the OCN; and
   in response to accessing the instant operational information, updating the DT based on the instant operation information.

9. The method of claim 8, wherein continuously receiving the instant operation information comprises:
   receiving information about optical power values measured at the components of the OCN, network configuration changes and states of components of the OCN.

10. The method of claim 1, wherein the controller is included in a Network Management System operatively connected to the components of the OCN.

11. The method of claim 1, wherein the desired optimization instruction comprises information about a desired concurrent optimization of a plurality of operational parameters, and executing the optical power optimization module comprises:
    determining a plurality of network configurations and a plurality of expected optimization level, each network configuration being associated with a corresponding expected optimization level; and
    providing the network configurations along with the corresponding expected optimization levels via a user-interface.

12. The method of claim 11, further comprising:
    receiving, from a user via the user-interface, indication of a selected network configuration; and
    applying the selected network configuration on the OCN.

13. The method of claim 1, further comprising, prior to applying the operational instructions on the OCN:
    providing, to a user, an indication of the predicted optimization level via a user-interface.

14. The method of claim 1, wherein accessing the DT of the OCN comprises:
    receiving, by the controller, a snapshot of the OCN, the snapshot comprising information about hardware and software characteristics of components of the OCN and interconnections between said components.

15. The method of claim 1, further comprising, prior to accessing the DT of the OCN:

generating the DT of the OCN by receiving, by the controller, a snapshot of the OCN, the snapshot comprising information about hardware and software characteristics of components of the OCN and interconnections between said components.

16. The method of claim 1, wherein the predicted optimization level satisfies the criterion in response to the predicted optimization level being above an optimization threshold.

17. The method of claim 16, wherein:
the desired optimization instruction further comprises information about a target optimization value for each of the at least one operational parameter to be optimized; and
the optimization threshold is based on the target optimization value.

18. A system for optimizing optical power management along one or more optical channels of an optical communication network (OCN), the OCN comprising a plurality of optical channels, the system comprising a controller and a memory, the memory comprising instructions which, upon being executed by the controller, cause the controller to:
access a digital twin (DT) of the OCN, the DT being configured to model components of the OCN and optical communications therebetween, the DT having been generated based at least in part on an initial architecture of the OCN;
access operational information of the OCN, the operational information of the OCN comprising information about optical power values of the one or more optical channels, network configurations and operational parameters thereof;
update the DT based at least in part on the operational information of the OCN;
receive a desired optimization instruction comprising information about:
an identification of the one or more optical channels, and
at least one operational parameter to be optimized;
execute an optical power optimization module on the DT, execution of the power algorithm comprising:
simulating application of at least one network configuration of the at least one optical channel, each network configuration having a corresponding predicted optimized level indicative of expected performances of the at least one optical channel for the corresponding network configuration;
for a given simulated network configuration, in response to the corresponding predicted optimization level of the given network configuration satisfying a criterion:
identify the given network configuration as a target network configuration, the target network configuration being expected to satisfy the criterion;
generate operational instructions for applying the target network configuration on the one or more optical channels, and
execute the operational instructions to apply the target network configuration on the OCN.

19. The system of claim 18, wherein the controller is further configured to:
generate the operational instructions comprises determining a sequence of adjustments for producing the target network configuration to be applied on the OCN; and
execute the operational instructions comprises applying the sequence of adjustments on the OCN.

20. The system of claim 18, wherein the OCN is a Wavelength Division Multiplexing (WDM) network.

21. The system of claim 18, wherein the desired optimization instruction is submitted by a user of the system to the controller.

22. The system of claim 18, wherein the controller is further configured to, for a given network configuration and in response to the corresponding predicted optimization level not satisfying the criterion:
adjust the given network configuration, thereby defining a new network configuration; and
generate, based on the new network configuration, a modified predicted optimization level.

23. The system of claim 22, wherein the optical power optimization module is a Machine Learning algorithm (MLA), a reinforcement learning algorithm (RLA) or a heuristic algorithm, the optical power optimization module having been trained to adjust a network configuration to increase performances of the one or more optical channels with respect to the at least one operational parameter.

24. The system of claim 18, wherein the at least one operational parameter comprises at least one of:
Optical Signal-to-Noise Ratio,
Optical Signal-to-Noise Ratio Loss,
Generalized Signal-to-Noise Ratio Loss,
Generalized Signal-to-Noise Ratio, and
Bit Error Rate.

25. The system of claim 18, wherein the controller is further configured to:
continuously access instant operational information of the OCN; and
in response to accessing the instant operational information, update the DT based on the instant operation information.

26. The system of claim 25, wherein the controller is further configured to:
receive information about optical power values measured at the components of the OCN, network configuration changes and states of components of the OCN.

27. The system of claim 18, wherein the controller is included in a Network Management System operatively connected to the components of the OCN.

28. The system of claim 18, wherein the desired optimization instruction comprises information about a desired concurrent optimization of a plurality of operational parameters, and the controller is further configured to, upon executing the optical power optimization module:
determine a plurality of network configurations and a plurality of expected optimization level, each network configuration being associated with a corresponding expected optimization level; and
provide the network configurations along with the corresponding expected optimization levels via a user-interface.

29. The system of claim 28, wherein the controller is further configured to:
receive from a user via the user-interface, indication of a selected network configuration; and
apply the selected network configuration on the OCN.

30. The system of claim 18, wherein the controller is further configured to, prior to applying the operational instructions on the OCN:
provide, to a user, an indication of the predicted optimization level via a user-interface.

31. The system of claim 18, wherein the controller is further configured to, in order to access the DT of the OCN:

receive a snapshot of the OCN, the snapshot comprising information about hardware and software characteristics of components of the OCN and interconnections between said components.

32. The system of claim 18, wherein the controller is further configured to, prior to accessing the DT of the OCN:
generate the DT of the OCN by receiving, by the controller, a snapshot of the OCN, the snapshot comprising information about hardware and software characteristics of components of the OCN and interconnections between said components.

33. The system of claim 18, wherein the predicted optimization level satisfies the criterion in response to the predicted optimization level being above an optimization threshold.

34. The system of claim 33, wherein:
the desired optimization instruction further comprises information about a target optimization value for each of the at least one operational parameter to be optimized; and
the optimization threshold is based on the target optimization value.

* * * * *